(12) United States Patent
Shin

(10) Patent No.: US 7,511,699 B2
(45) Date of Patent: Mar. 31, 2009

(54) OPTICAL POINTING SYSTEM AND METHOD FOR CONTROLLING POWER AND/OR CLOCK SIGNAL THEREOF

(75) Inventor: Young-Ho Shin, Yongin-si (KR)

(73) Assignee: ATLab Inc. (KR)

( * ) Notice: Subject to any disclaimer, the term of this patent is extended or adjusted under 35 U.S.C. 154(b) by 522 days.

(21) Appl. No.: 11/050,972

(22) Filed: Feb. 4, 2005

(65) Prior Publication Data
US 2005/0194521 A1 Sep. 8, 2005

(30) Foreign Application Priority Data
Feb. 4, 2004 (KR) ............... 10-2004-0007358

(51) Int. Cl.
*G09G 5/08* (2006.01)
*G06F 3/033* (2006.01)

(52) U.S. Cl. ............... 345/166; 345/157; 345/163; 713/300; 713/320; 713/330; 713/340

(58) Field of Classification Search .......... 345/156, 345/157, 159, 161, 163, 166; 713/300, 310, 713/320, 322, 330, 340
See application file for complete search history.

(56) References Cited
U.S. PATENT DOCUMENTS

| | | | | |
|---|---|---|---|---|
| 4,799,055 A | * | 1/1989 | Nestler et al. ............... | 345/166 |
| 4,920,260 A | * | 4/1990 | Victor et al. ............... | 250/221 |
| 5,274,361 A | * | 12/1993 | Snow ............... | 345/166 |
| 6,770,863 B2 | * | 8/2004 | Walley ............... | 250/221 |
| 6,995,748 B2 | * | 2/2006 | Gordon et al. ............... | 345/166 |
| 7,050,798 B2 | * | 5/2006 | Ranta ............... | 455/423 |
| 2004/0113890 A1 | * | 6/2004 | Ranta ............... | 345/166 |
| 2004/0130532 A1 | * | 7/2004 | Gordon et al. ............... | 345/166 |
| 2005/0190158 A1 | * | 9/2005 | Casebolt et al. ............... | 345/166 |

* cited by examiner

*Primary Examiner*—My-Chau T Tran
(74) *Attorney, Agent, or Firm*—Cantor Colburn LLP (57) ABSTRACT

Disclosed are an optical pointing system and method for controlling power and/or clock signal thereof. The optical pointing system includes a movement speed sensing unit for calculating a movement speed using a movement value, a variable power unit for varying a magnitude of power supply voltage according to the calculated movement speed, and a variable clock signal generating unit for adaptively varying an operating speed of a circuit by varying a frequency of a supplied clock signal according to the calculated movement speed. Thus, it is possible to reduce power consumption by adaptively varying the operating speed of the circuit based on the magnitude of the supplied power and/or the frequency of the clock signal according to the movement speed.

10 Claims, 7 Drawing Sheets

OPTICAL POINTING SYSTEM AND METHOD FOR CONTROLLING POWER AND/OR CLOCK SIGNAL THEREOF

CROSS-REFERENCE TO RELATED APPLICATION

This application claims the benefit of Korean Patent Application No. 2004-7358, filed on Feb. 4, 2004, the disclosure of which is hereby incorporated herein by reference in its entirety.

BACKGROUND OF THE INVENTION

1. Field of the Invention

The present invention relates to an optical pointing system, and more particularly, to an optical pointing system and method for controlling power and/or clock signal thereof, capable of adaptively varying a magnitude of power and/or a frequency of clock signal supplied according to a movement speed of the optical pointing system.

2. Description of the Related Art

Figure 1:
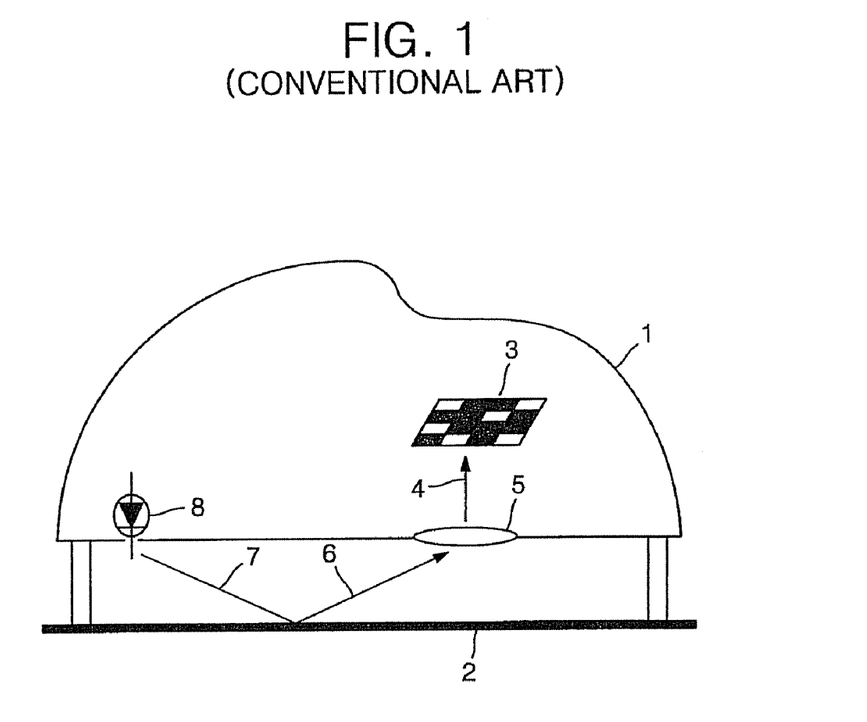
FIG. 1 shows a general optical pointing system.

FIG. 1 shows a general optical pointing system, in which the optical pointing system is composed of a light source 8, a lens 5, and an image sensor 3 in a movement sensing unit (not shown).

In FIG. 1, among reference numbers, 2 indicates a surface of a worktable, and 4, 6 and 7 indicate light.

In the optical pointing system shown in FIG. 1, the light 7 emitted from the light source 8 is reflected on the worktable surface 2, and the reflected light 6 passes through the lens 5. The light 4 passing through the lens 5 is inputted into the image sensor 3 which is located in the movement sensing unit (not shown) and is included in a CMOS (Complementary Metal Oxide Semiconductor) device.

An image of the worktable surface 2 is continuously sensed by the image sensor 3, and is outputted to a sensor circuit (not shown). The sensor circuit calculates a correlation value between currently inputted image data and previously inputted image data and a movement value, and then transmits the calculated movement value to a computer system.

Figure 2:
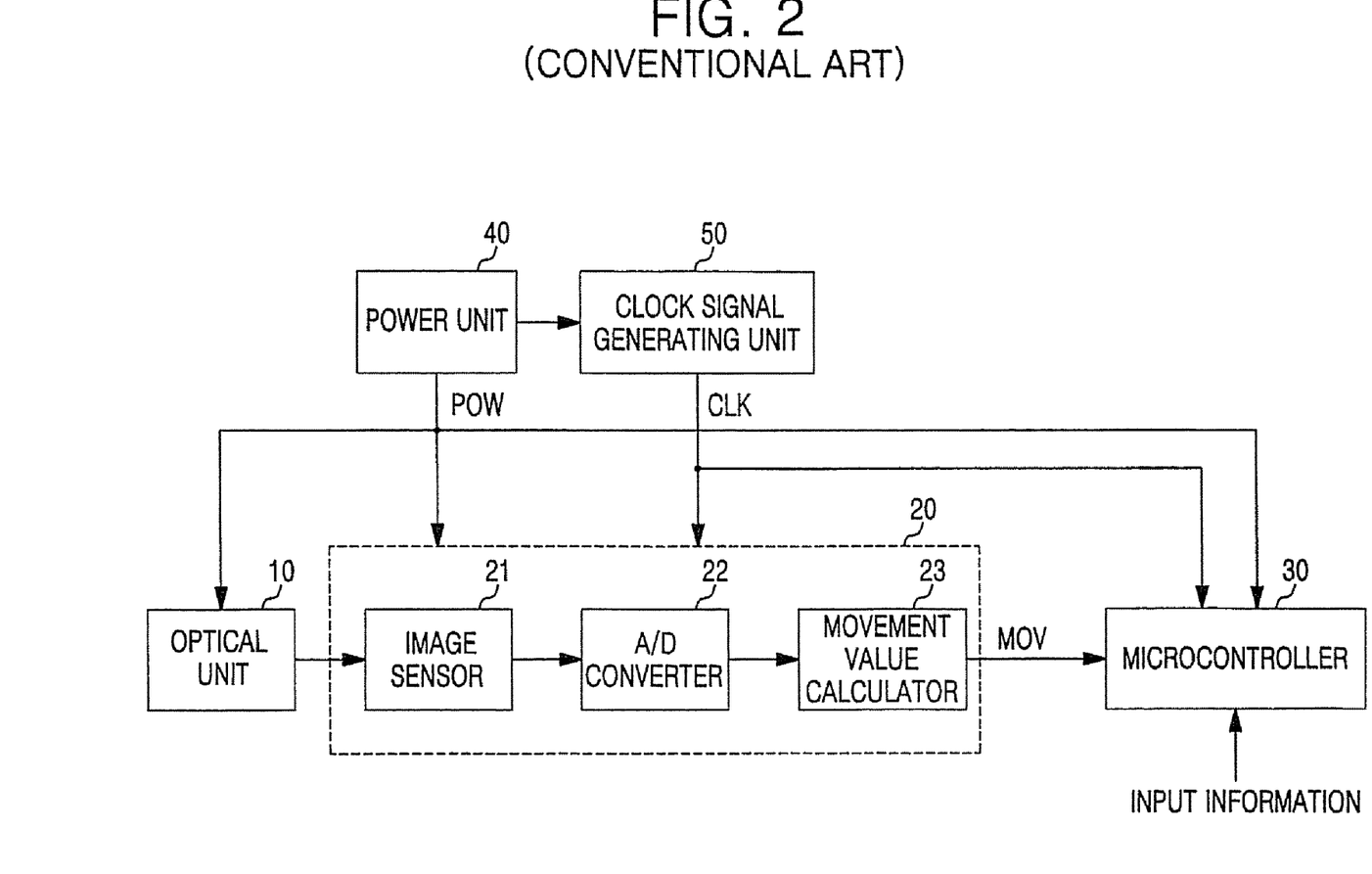
FIG. 2 is a block diagram of a conventional optical pointing system.

FIG. 2 is a block diagram showing a conventional optical pointing system, in which the optical pointing system is composed of an optical unit 10, a movement sensing unit 20, a microcontroller 30, a power unit 40, and a clock signal generating unit 50. In FIG. 2, the movement sensing unit 20 includes an image sensor 21, an A/D converter 22 and a movement value calculator 23.

Hereinafter, functions of each of the blocks shown in FIG. 2 will be described.

The optical unit 10 is composed of a lamp, a lens and other attachments. The optical unit 10 irradiates light toward an object (for example, a surface of a worktable) through a lamp, and transmits the light reflected on the object (to the image sensor 21 via the lens. The movement sensing unit 20 calculates a movement value MOV using an optical image transmitted from the optical unit 10. The image sensor 21 receives the reflected light through the lens to sense image data. The A/D converter 22 receives an analog signal outputted from the image sensor 21 and converts the received analog signal into a digital signal. The movement value calculator 23 calculates and outputs the movement value MOV from the image data that is the output signal of the A/D converter 22. The microcontroller 30 receives the movement value MOV outputted from the movement sensing unit 20 and other external input information and transmits the received results to a computer (not shown) based on a specification required at the computer.

The power unit 40 supplies required power POW of a fixed magnitude to a circuit. The clock signal generating unit 50 supplies a required clock signal CLK of a fixed frequency to each part of the circuit.

When the optical pointing system moving on the object including the worktable intends to obtain the movement value, the optical pointing system must obtain discrete image frames and then calculate the movement value through comparison and analysis between the image frames. Thus, in order to obtain a normal movement value, the following condition should be satisfied: the greater the movement speed of the optical pointing system becomes, the faster an operating speed of the circuit such as an acquisition speed of the image frame should be.

In the conventional optical pointing system as mentioned above, in order to get rid of problems when the optical pointing system operates at the fastest speed, the power and clock signal corresponding to the fastest speed are supplied fixedly. However, in the case of electrical devices, as the operating speed becomes faster, power consumption is proportionally increased as well. Further, in general, in an integrated circuit produced by a CMOS process, the operating speed is proportional to a supply voltage, while consumed power is proportional to a square of an applied supply voltage. Thus, the conventional optical pointing system undergoes undesired power consumption.

SUMMARY OF THE INVENTION

It is, therefore, an objective of the present invention to provide an optical pointing system capable of decreasing power consumption by varying a an operating speed of a circuit based on a magnitude of power and/or a frequency of a clock signal according to a movement speed.

It is another objective of the present invention to provide a method for controlling power and/or clock signal capable of accomplishing the first objective.

In order to accomplish the first objective, the present invention provides an optical pointing system including a movement speed sensing unit for calculating a movement speed using a movement value, and a variable power unit for varying a magnitude of power according to the movement speed.

The optical pointing system of the present invention further includes a variable clock signal generating unit for varying a frequency of a clock signal according to the movement speed.

The variable power unit of the optical pointing system includes a power setting part for outputting a power setting value which is set in correspondence to the movement speed, and a power converting part for converting the power setting value into the power.

The variable clock signal generating unit of the optical pointing system includes a counter setting part for outputting at least one counter setting value which is set in correspondence to the movement speed, and a frequency converting part for converting the frequency of the clock signal using the counter setting value.

In order to accomplish the second objective, the present invention provides a method for controlling power and/or clock signal of an optical pointing system. The method includes a calculating step of calculating a movement speed using a movement value, and a power and/or frequency varying step of changing a magnitude of the power and/or a frequency of the clock signal according to the movement speed.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

An optical pointing system according to the present invention will now be described more fully hereinafter with reference to the accompanying drawings, in which preferred embodiments of the invention are shown.

Figure 3:
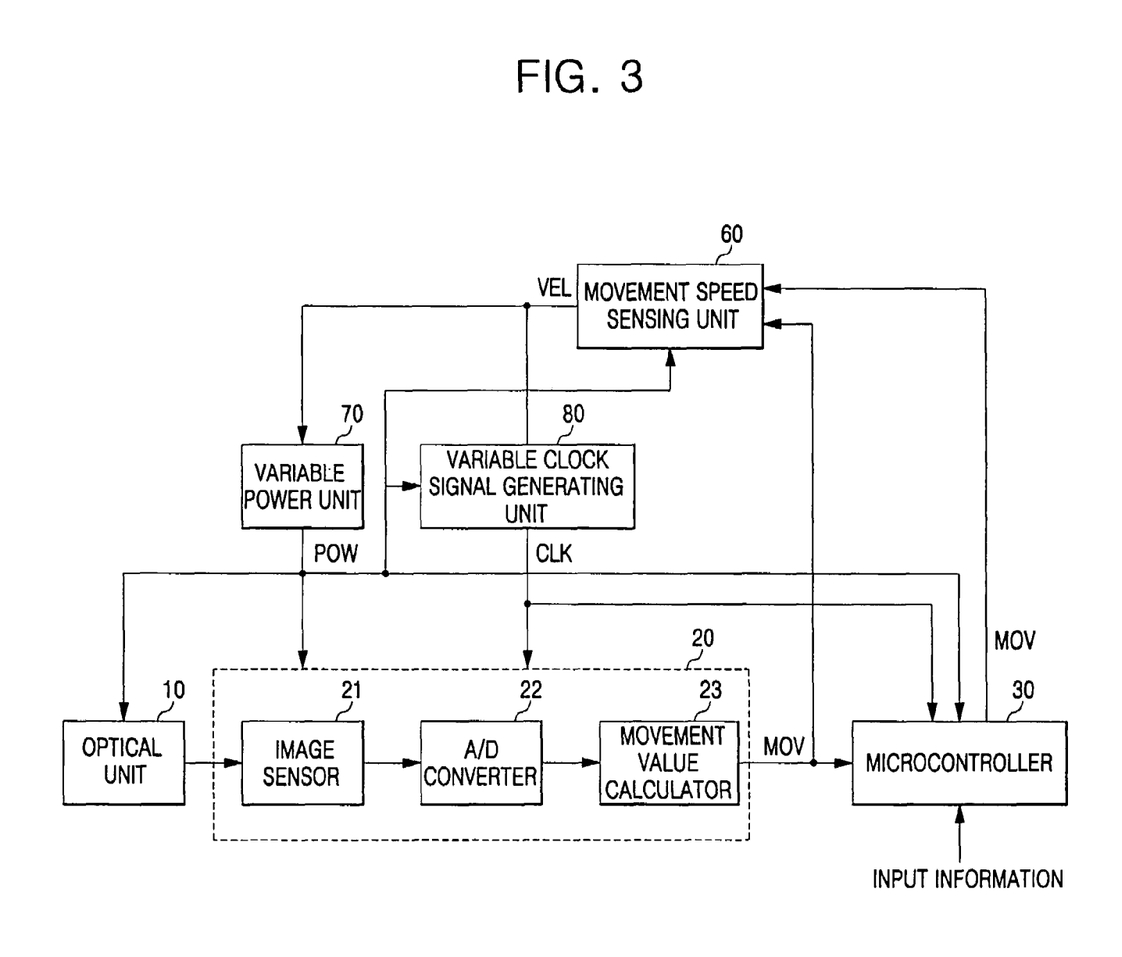
FIG. 3 is a block diagram of an optical pointing system of the present invention.

FIG. 3 is a block diagram of an optical pointing system of the present invention, in which the optical pointing system is composed of an optical unit 10, a movement sensing unit 20, a microcontroller 30, a movement speed sensing unit 60, a variable power unit 70, and a variable clock signal generating unit 80. In FIG. 3, the movement sensing unit 20 is composed of an image senor 21, an A/D converter 22 and a movement value calculator 23.

In FIG. 3, all the blocks except for the optical unit 10 may be implemented in a single semiconductor device.

The following description will be made about functions of each of the blocks shown in FIG. 3.

The optical unit 10, the movement sensing unit 20, the microcontroller 30, the image senor 21, the A/D converter 22 and the movement value calculator 23 perform the same functions as the blocks shown in FIG. 2.

The movement speed sensing unit 60 receives a movement value MOV either from the movement value calculator 23 in the movement sensing unit 20 or the microcontroller 30, and calculates a movement speed VEL. The variable power unit 70 receives the movement speed VEL from the movement speed sensing unit 60, and variably supplies power POW corresponding to the movement speed to each part of the circuit. Although not shown, the variable power unit 70 may variably supply the required power POW using a clock signal generated from the variable clock signal generating unit 80. In other words, the variable power unit 70 increases a magnitude of the supplied power POW when the movement speed VEL is fast, and decreases the magnitude of the supplied power POW when the movement speed VEL is slow. The variable clock signal generating unit 80 receives the movement speed VEL from the movement speed sensing unit 60, and supplies a clock signal CLK of a frequency corresponding to the movement speed to each part of the circuit. That is to say, the variable clock signal generating unit 80 increases a frequency of the clock signal CLK when the movement speed VEL is fast, and decreases the frequency of the clock signal CLK when the movement speed VEL is slow.

Figure 4:
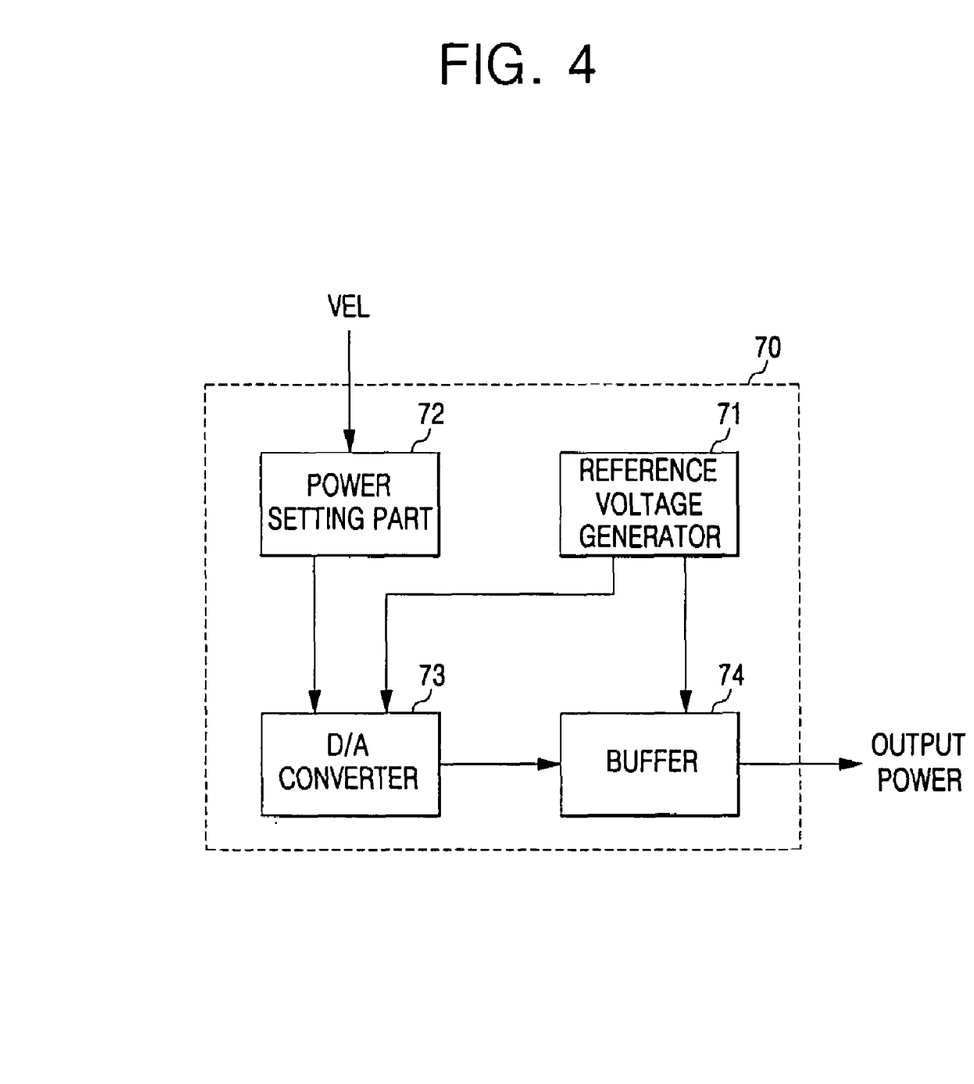
FIG. 4 is a block diagram showing an embodiment of a variable power unit of an optical pointing system of the present invention.

FIG. 4 is a block diagram showing an embodiment of a variable power unit of an optical pointing system of the present invention, in which the variable power unit is composed of a reference voltage generator 71, a power setting part 72, a D/A converter 73, and a buffer 74.

Functions of the blocks shown in FIG. 4 will be described as follows.

The reference voltage generator 71 supplies required bias power to each parts of the circuit. The power setting part 72 may be composed of a register, etc. The power setting part 72 receives a movement speed VEL from the movement speed sensing unit 60 while reserving a power setting value corresponding to the movement speed, and outputs the power setting value corresponding to the movement speed to the D/A converter 73. The D/A converter 73 receives the power setting value from the power setting part 72, and converts the power setting value into analog power. The buffer 74 receives and buffers the analog power that is an output of the D/A converter 73, and supplies output power POW to each component.

Figure 5:
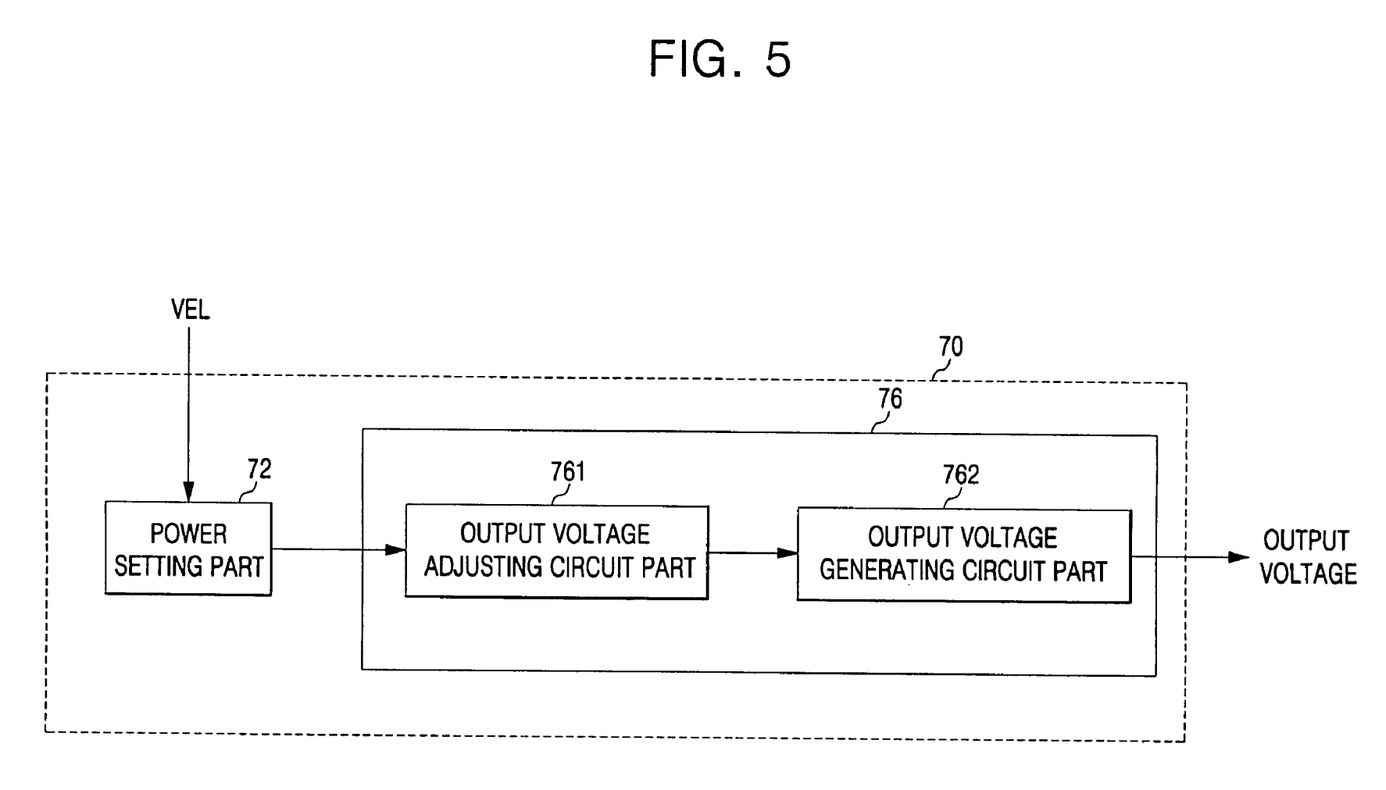
FIG. 5 is a block diagram showing another embodiment of a variable power unit of an optical pointing system of the present invention.

FIG. 5 is a block diagram showing another embodiment of a variable power unit of an optical pointing system of the present invention, in which the variable power unit is composed of a power setting part 72 and DC-DC converter 76. The DC-DC converter 76 is composed of an output voltage adjusting circuit part 761 and an output voltage generating circuit part 762.

A description about functions of the blocks shown in FIG. 5 is as follows.

The power setting part 72 may be composed of a register etc. The power setting part 72 receives a movement speed VEL from the movement speed sensing unit 60 while reserving a power setting value corresponding to the movement speed, and outputs a power setting value corresponding to the movement speed to the output voltage adjusting circuit part 761 of the DC-DC converter 76. The DC-DC converter 76 converts external power into output power POW corresponding to the power setting value in response to the power setting value received from the power setting part 72, and supplies the converted output power to each component. The output voltage adjusting circuit part 761 receives the power setting value from the power setting part 72, converts the received power setting value into a voltage setting value, and outputs the converted voltage setting value to the output voltage generating circuit part 762. The output voltage generating circuit part 762 receives the voltage setting value from the output voltage adjusting circuit part 761, and supplies the output power POW corresponding to the received voltage setting value to each component.

In other words, the variable power unit of the optical pointing system of the present invention as shown in FIGS. 4 and 5 is designed to vary the magnitude of the supplied power using the power setting value corresponding to the movement speed stored in the power setting part, thus being capable of adaptively varying the magnitude of the supplied power according to the movement speed.

Figure 6:
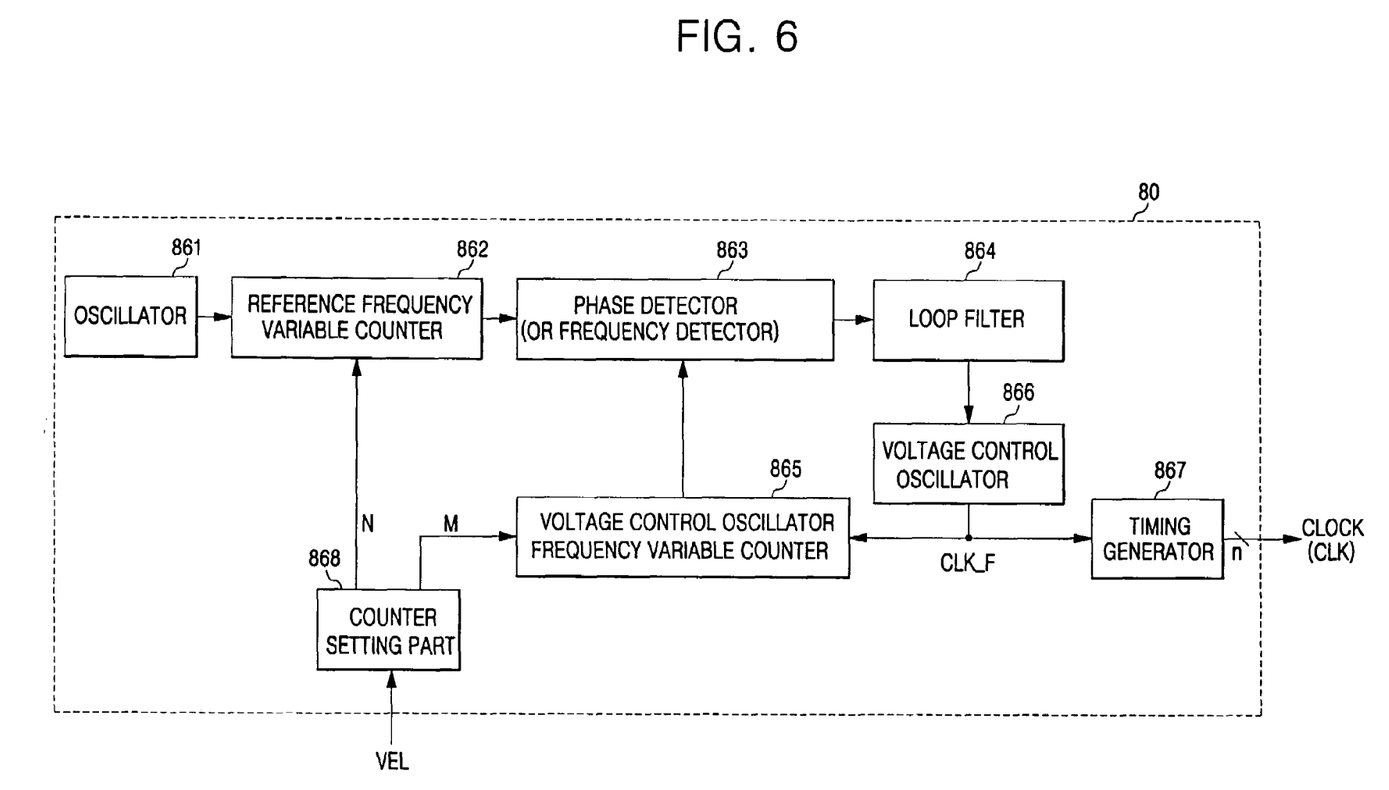
FIG. 6 is a block diagram showing an embodiment of a variable clock signal generating unit of an optical pointing system of the present invention.

FIG. 6 is a block diagram showing an embodiment of a variable clock signal generating unit of an optical pointing system of the present invention, in which the variable clock signal generating unit is composed of an oscillator 861, a reference frequency variable counter 862, a voltage control oscillator (VCO) frequency variable counter 865, a phase detector (or frequency detector) 863, a loop filter 864, a voltage control oscillator (VCO) 866, a timing generator 867, and a counter setting part 868. In other words, the variable clock signal generating unit has the same structure as a general phase locked loop (PLL) or frequency locked loop (FLL).

A description about functions of the blocks shown in FIG. 6 is as follows.

The oscillator 861 stably generates a signal of a specific frequency. The counter setting part 868 may be composed of a register, etc. The counter setting part 868 outputs counter setting values N and M corresponding to a movement speed VEL outputted at the movement speed sensing unit 60 while storing the counter setting values corresponding to the movement speed. The reference frequency variable counter 862 and the voltage control oscillator (VCO) frequency variable counter 865 output signals of frequencies which divide a frequency of an input signal by each of the counter setting values N and M. The phase detector (or frequency detector) 863 outputs, to the loop filter 864, a signal corresponding to a phase difference (or frequency difference) between a output signal of the oscillator 861 inputted through the reference frequency variable counter 862 and a output signal of the voltage control oscillator (VCO) 866 inputted through the voltage control oscillator frequency variable counter 865. The loop filter 864 outputs a DC voltage, which corresponds to the output signal of the phase detector (or frequency detector) 863, to the voltage control oscillator 866. The voltage control oscillator 866 outputs a fundamental clock signal CLK_F of the frequency corresponding to the DC voltage outputted from the loop filter 864. The timing generator 867 outputs required clock signals CLK to each part of the circuit using the fundamental clock signal CLK_F that is the output signal of the voltage control oscillator 866.

In other words, the variable clock signal generating unit of the optical pointing system of the present invention as shown in FIG. 6 sets appropriate counter setting values N and M according to the movement speed before anything else. Here, in the state where the M value is fixed, the frequency of the fundamental clock signal CLK_F is decreased when the N value is increased, while the frequency of the fundamental clock signal CLK_F is increased when the N value is decreased. Further, in the state where the N value is fixed, the frequency of the fundamental clock signal CLK_F is increased when the M value is increased, while the frequency of the fundamental clock signal CLK_F is decreased when the M value is decreased. That is, the frequency of the fundamental clock signal CLK_F is varied through the PLL (or FLL) using appropriately set N and M values. Therefore, it is possible to vary the frequency of the fundamental clock signal CLK_F supplied to each part of the circuit. Consequently, the variable clock signal generating unit is designed to be capable of adaptively varying an operating speed of the circuit according to the movement speed.

Figure 7:
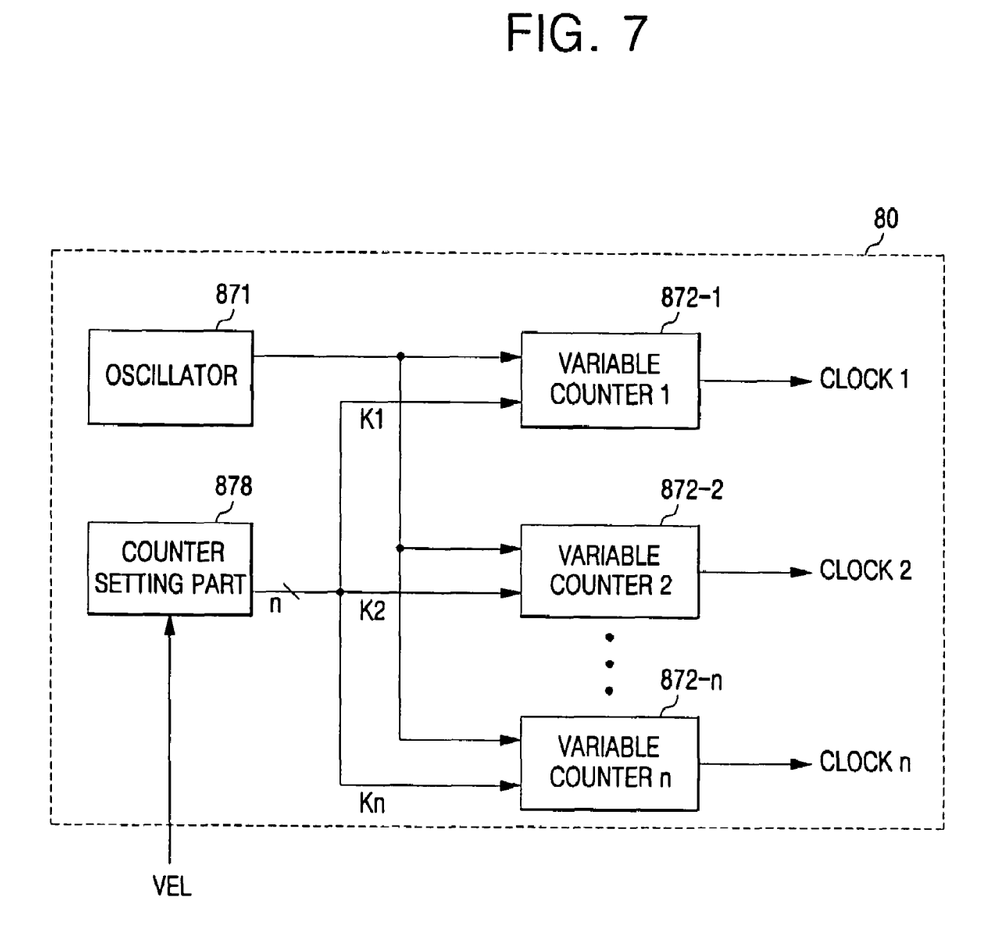
FIG. 7 is a block diagram showing another embodiment of a variable clock signal generating unit of an optical pointing system of the present invention.

FIG. 7 is a block diagram showing another embodiment of a variable clock signal generating unit of an optical pointing system of the present invention, in which the variable clock signal generating unit is composed of an oscillator 871, variable counters 872-1, 872-2, ..., 872-n, and a counter setting part 878.

A description about functions of the blocks shown in FIG. 7 is as follows.

The oscillator 871 stably generates a signal of a specific frequency. The counter setting part 878 may be composed of a register, etc. The counter setting part 878 outputs counter setting values K1, K2 ... Kn, which correspond to movement speeds VEL outputted from the movement speed sensing unit 60, to the variable counters 872-1, 872-2, ..., 872-n respectively while storing the counter setting values corresponding to the movement speeds. The variable counters 872-1, 872-2, ..., 872-n output clock signals of the frequencies which divide a frequency of a signal inputted from the oscillator 871 by each of the counter setting values K1, K2 ... Kn. The number of the variable counters has to have as many as the number of required clock signals.

In other words, the variable clock signal generating unit of the optical pointing system of the present invention as shown in FIG. 7 is constructed to directly vary the frequencies of the clock signals using the counter setting values corresponding to the movement speeds stored in the counter setting part 878, thus being capable of adaptively varying an operating speed of the circuit according to the movement speeds.

Therefore, the optical pointing system of the present invention increases the frequency of the clock signal supplied to the circuit when the movement speed is fast, thereby making the operating speed of the circuit fast and simultaneously increasing the magnitude of the power supplied to the circuit, and decreases the frequency of the clock signal supplied to the circuit when the movement speed is slow, thereby making the operating speed of the circuit slow and simultaneously decreasing the magnitude of the power supplied to the circuit. As a result, it is possible to reduce power consumption.

As set forth above, according to the optical pointing system and method for controlling power and/or clock signal thereof, it is possible to reduce power consumption by adaptively varying the operating speed of the circuit based on the magnitude of the power and/or the frequency of the clock signal according to the movement speed of the optical pointing system.

Therefore, the method for controlling power and/or clock signal according to the present invention will be availably applied to an input device used in wireless equipment such as an optical mouse, a mobile phone, a personal digital assistant (PDA) or so forth.

Although a preferred embodiment of the present invention has been described for illustrative purposes, it is apparent to those skilled in the art that various modifications, additions and substitutions are possible, without departing from the scope and spirit of the invention as disclosed in the accompanying claims.

What is claimed is:

1. An optical pointing system comprising:
 a movement speed sensing unit for calculating a movement speed using a movement value; and
 a variable power unit for varying a magnitude of power supply voltage according to the movement speed,
 wherein the variable power unit includes:
 a power setting part for outputting a power setting value which is set in correspondence to the movement speed; and
 a power converting part for converting the power setting value into power supply voltage.

2. The optical pointing system as set forth in claim 1, wherein the power converting part includes a D/A converter for converting the power setting value into analog power.

3. The optical pointing system as set forth in claim 1, wherein the power converting part includes a DC-DC converter capable of converting the magnitude of the outputted power supply voltage by use of the power setting value.

4. An optical pointing system comprising:
 a movement speed sensing unit for calculating a movement speed using a movement value;
 a variable power unit for varying a magnitude of power supply voltage according to the movement speed; and a variable clock signal generating unit for varying a frequency of a clock signal according to the movement speed wherein the variable clock signal generating unit includes:

a counter setting part for outputting at least one counter setting value which is set in correspondence to the movement speed; and a frequency converting part for converting the frequency of the clock signal using the counter setting value.

5. The optical pointing system as set forth in claim 4, wherein the frequency converting part includes a phase locked loop having:

a reference frequency variable counter for varying a reference frequency using any one of the counter setting values; and a voltage control oscillator frequency variable counter for varying a voltage control oscillator frequency using any one of the counter setting values.

6. The optical pointing system as set forth in claim 4, wherein the frequency converting part includes a frequency locked loop having:

a reference frequency variable counter for varying a reference frequency using any one of the counter setting values; and a voltage control oscillator frequency variable counter for varying a voltage control oscillator frequency using any one of the counter setting values.

7. The optical pointing system as set forth in claim 4, wherein the variable power unit includes:

a power setting part for outputting a power setting value which is set in correspondence to the movement speed; and a power converting part for converting the power setting value into power supply voltage.

8. A method for controlling power and clock signal of an optical pointing system, the method comprising:

a calculating step of calculating a movement speed using a movement value; and a power and frequency varying step of changing a magnitude of the power supply voltage and a frequency of the clock signal according to the movement speed wherein the power and frequency varying step includes:

a setting step of setting a power setting value and a counter setting value corresponding to the movement speed; and an outputting step of outputting the power of a magnitude corresponding to the power setting value and the clock signal of a frequency corresponding to the counter setting value.

9. An optical pointing system comprising:

a movement speed sensing unit for calculating a movement speed using a movement value;

a variable power unit for varying a magnitude of power supply voltage according to the movement speed;

a variable clock signal generating unit for varying a frequency of a clock signal according to the movement speed;

an image sensor for sensing light reflected from an object to generate an analog image signal;

an A/D converter for receiving the analog image signal outputted from the image sensor and converting the received analog image signal into a digital signal;

a movement value calculator for calculating a movement value from the digital signal outputted from the A/D converter; and a microcontroller for processing the movement value and input information.

10. The optical pointing system as set forth in claim 9, wherein the image sensor, the A/D converter, the movement value calculator, the movement speed sensing unit, the variable power unit, the variable clock signal generating unit and the microcontroller are implemented in a single semiconductor device.

* * * * *